Nov. 18, 1958     W. B. HORTON     2,860,862
METHODS AND APPARATUS FOR WIRE SAWING
Original Filed Aug. 26, 1954     4 Sheets-Sheet 1
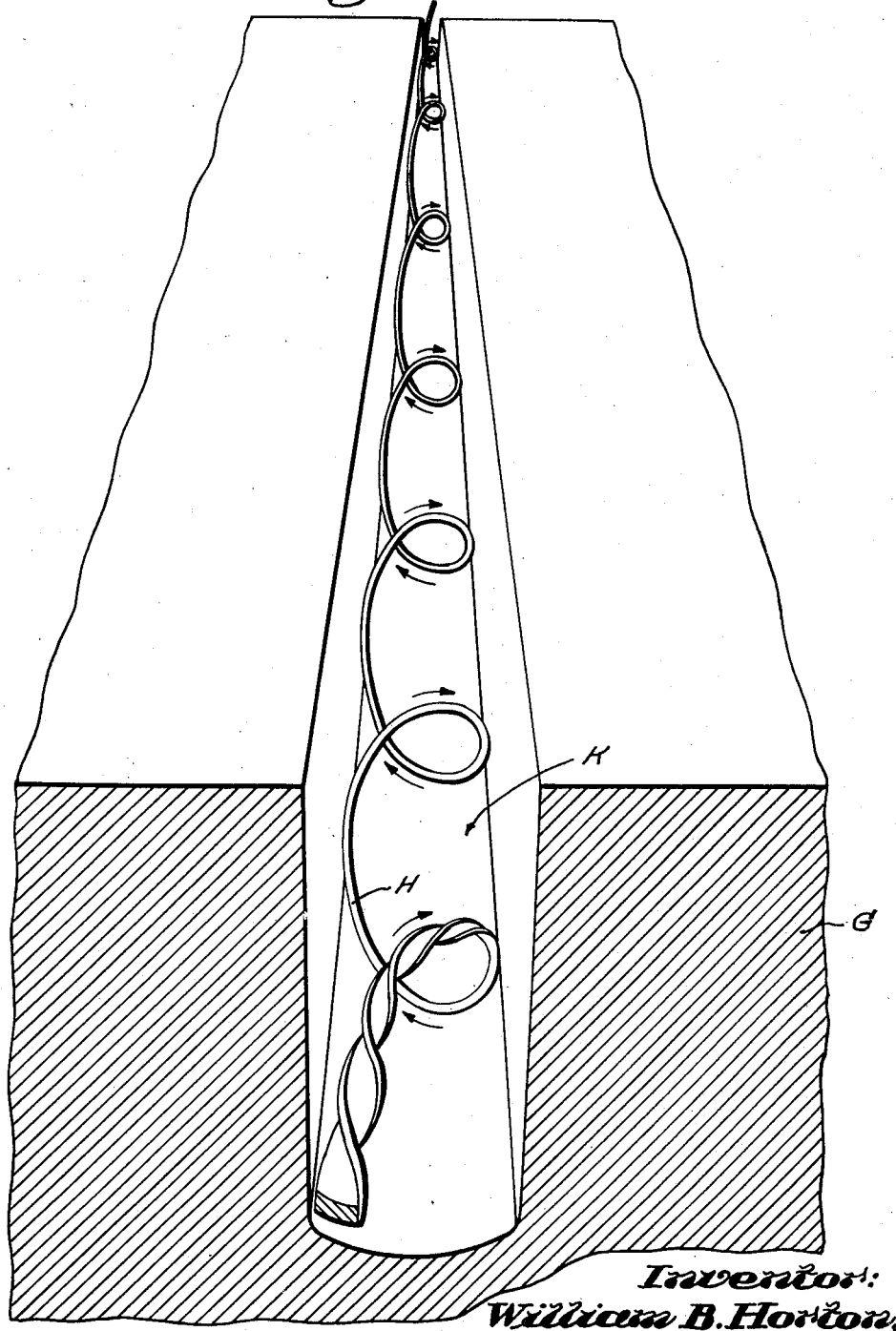

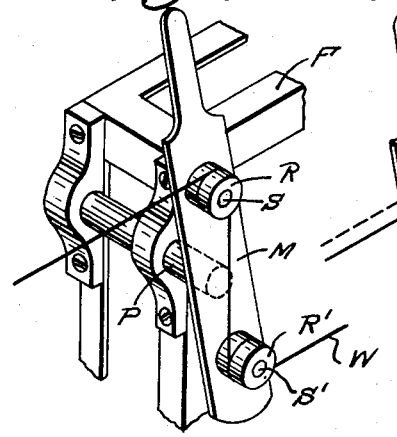
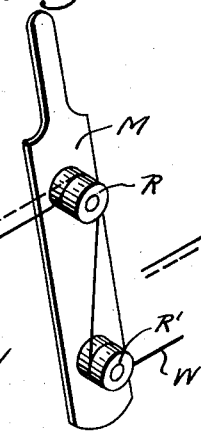
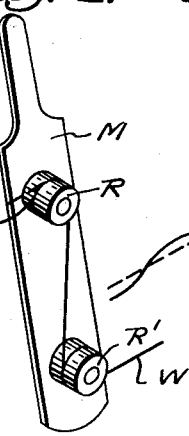
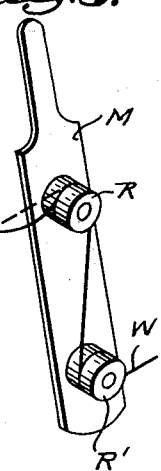
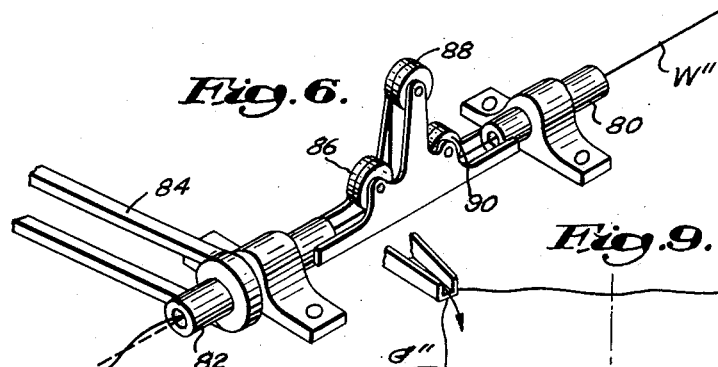
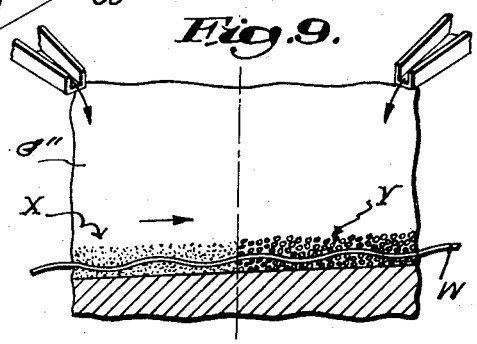
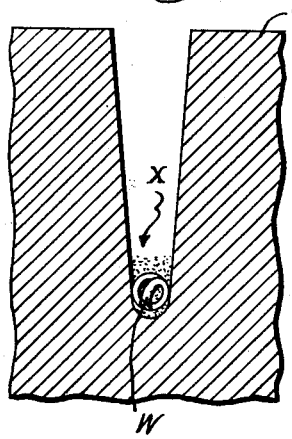
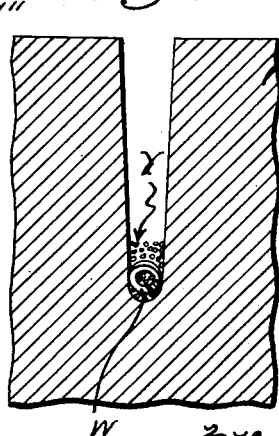
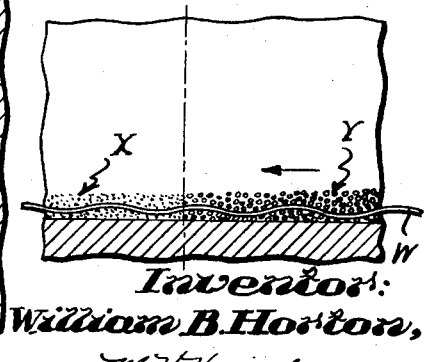

Nov. 18, 1958  W. B. HORTON  2,860,862
METHODS AND APPARATUS FOR WIRE SAWING
Original Filed Aug. 26, 1954  4 Sheets-Sheet 3
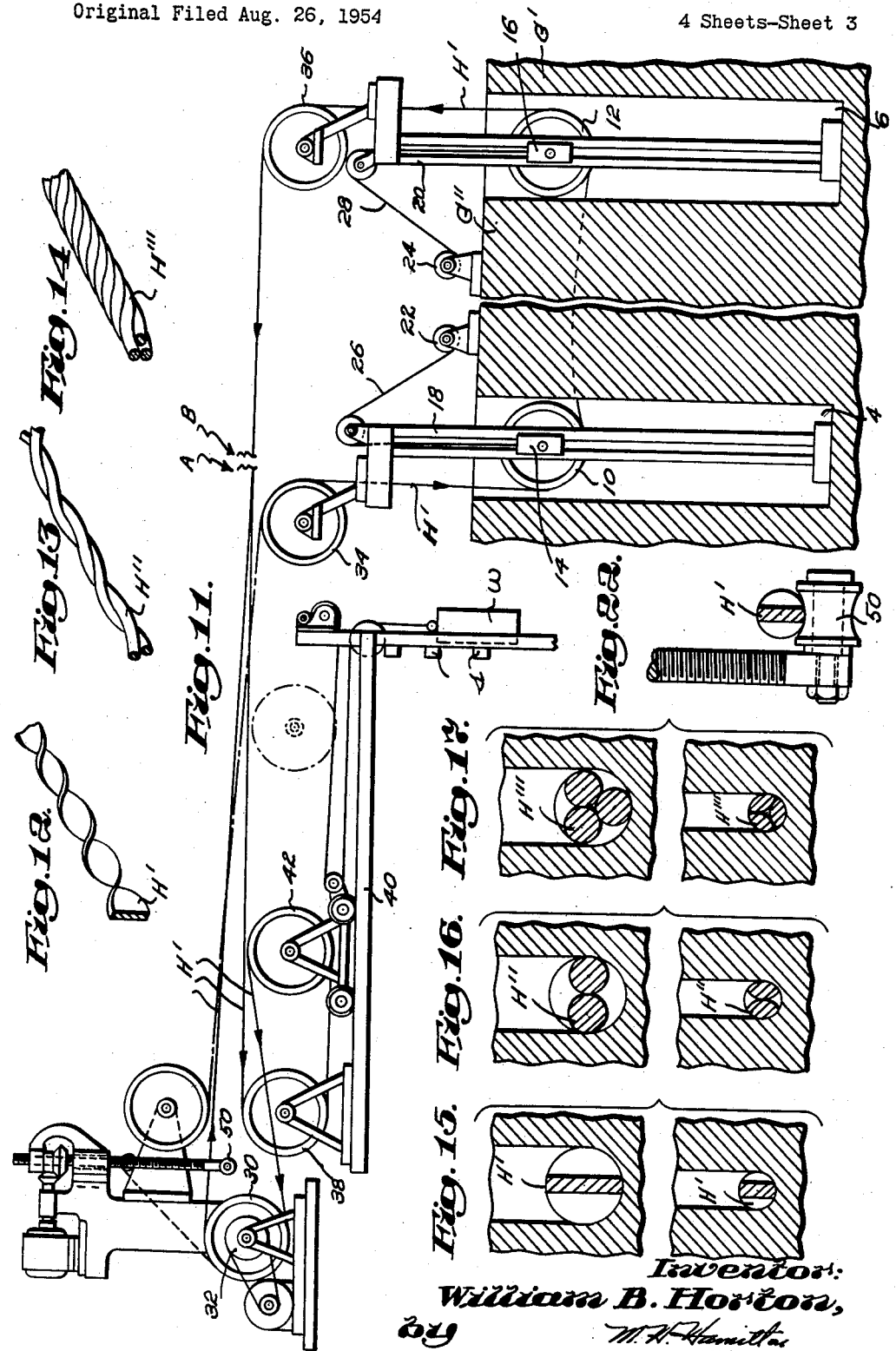

Nov. 18, 1958 W. B. HORTON 2,860,862
METHODS AND APPARATUS FOR WIRE SAWING
Original Filed Aug. 26, 1954 4 Sheets-Sheet 4
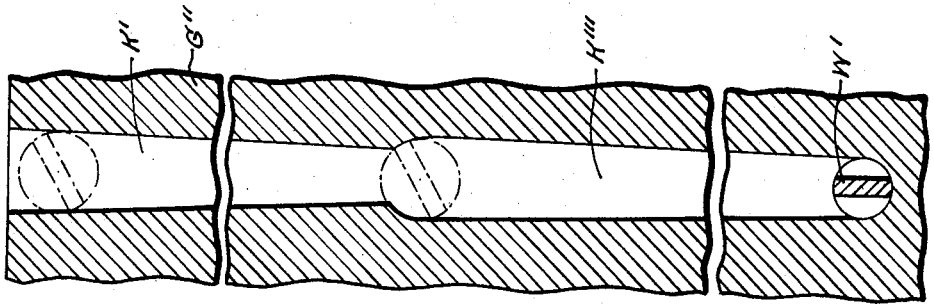
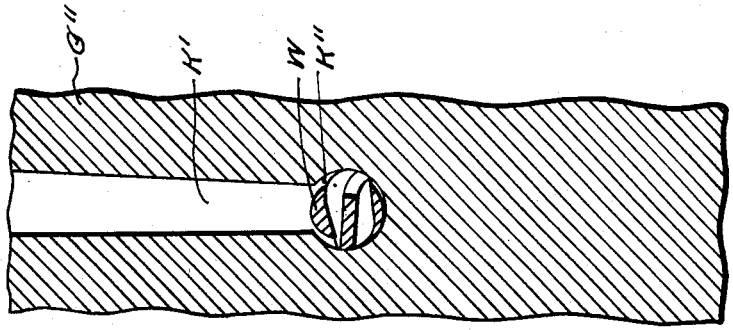
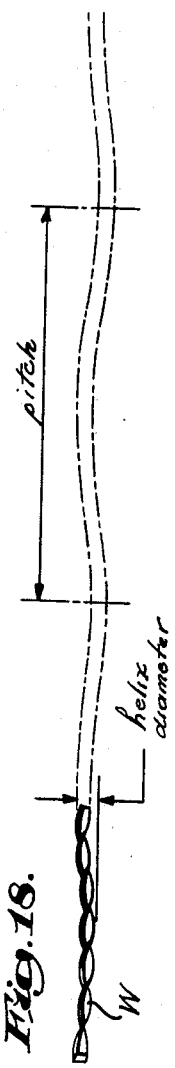
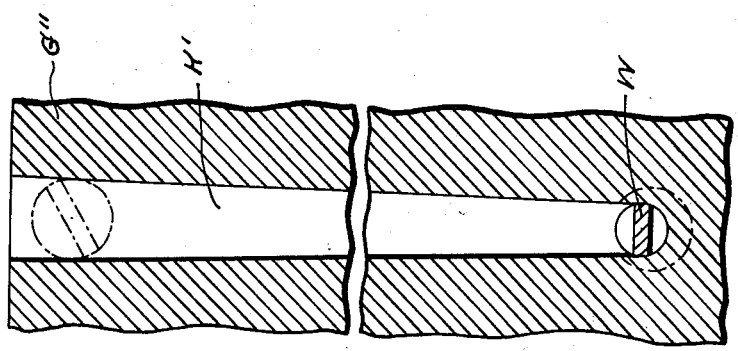
Inventor:
William B. Horton,
by
M. T. Hamilton
Attorney

United States Patent Office 2,860,862
Patented Nov. 18, 1958

2,860,862

METHODS AND APPARATUS FOR WIRE SAWING

William B. Horton, Concord, Mass., assignor to H. E. Fletcher Co., West Chelmsford, Mass., a corporation of Massachusetts Continuation of application Serial No. 452,275, August 26, 1954. This application April 12, 1957, Serial No. 652,530

11 Claims. (Cl. 262—28)

This invention relates to a method of wire sawing granite and, in particular, to a method of sawing relatively large granite slabs from a block of this material as it occurs naturally in granite quarries.

Conventional wire sawing operations must be carried out in conjunction with an abrasive consisting of relatively hard abrasive material in order to cut granite as distinguished from limestone and other relatively soft mineral deposits. As a result, wire sawing of granite is subject to excessively rapid saw wear. This wear problem can be met, up to a certain point, by increasing the length of the saw loop employed, but there is a definite limit on the amount of increase in saw length which can be mechanically handled to advantage. This fact operates to sharply limit the life of such a saw to a point where its use in many cases is not feasible. The difficulty indicated might be overcome by replacing the worn wire with a new wire were it not for the fact that the worn wire not only decreases in diameter but forms a kerf which also decreases in width to a point where it is impossible to reeve through a new wire of proper size.

It has been proposed, as one solution to the problem, to run a slack wire in a cut and allow the wire to slap back and forth as it is drawn along the saw cut in order to enlarge the cut laterally and thus permit entering a new larger wire. However, this proposal, although workable to some extent with a substance such as limestone, has little if any cutting effect on granite and, because of this fact, wire sawing of large granite slabs, so far as I am aware, is not being successfully carried out in the industry, notwithstanding the fact that wire sawing technique in general has been well known to those skilled in the art for a period of many years.

It is an object of the present invention to deal with the problems indicated and to devise an improved method and apparatus for wire sawing with a view to eliminating the need for running exceedingly long lengths of saw wire in a granite slabbing operation.

These and other objects and novel features will be more fully understood and appreciated from the following description of preferred embodiments of the invention selected for purposes of illustration and shown in the accompanying drawings, in which:

Fig. 1 is a fragmentary perspective view illustrating a block of granite through which is located a saw cut formed in accordance with the method of the invention and further illustrating the novel saw element of the invention;

Fig. 2 is a fragmentary perspective view of a wire saw forming apparatus of the invention further illustrating the step of reforming a conventional saw element into a helical reaming saw body;

Fig. 3 and also Figs. 4 and 5 are detail perspective views illustrating three steps in progressively forming a wire saw into a helical body;

Fig. 6 is a fragmentary perspective view of a modified wire forming apparatus;

Fig. 7 is a detail fragmentary cross-sectional view of a block of granite showing a reaming saw in an operating position;

Fig. 8 is a view similar to Fig. 7 but further illustrating the use of a different type of abrasive with a reaming saw;

Figs. 9 and 10 illustrate diagrammatically the steps shown in Figs. 7 and 8, respectively;

Fig. 11 is a side elevational view indicating diagrammatically one preferred form of wire sawing apparatus which may be employed in carrying out the method of the invention;

Fig. 12 is a detail perspective view of one type of wire saw which I may utilize in carrying out one of the steps of my invention;

Figs. 13 and 14 show alternate forms of wire saw elements which are also suitable for use in carrying out steps of my invention;

Fig. 15 is a view in two parts showing, in fragmentary cross section, a saw kerf at two different points in the course of a cutting operation and further indicating the change in size of the saw member as the latter progresses downwardly through the body which is being sawn;

Figs. 16 and 17 are views similar to Fig. 15 but showing multiple strand types of saw members corresponding to those of Figs. 13 and 14, and also indicating the wear which occurs in these types of saws;

Fig. 18 is a side elevational view of one form of improved wire saw element of the invention;

Fig. 19 is a fragmentary cross-sectional view of a body of material having a saw cut formed therein by means of a saw of the type indicated in Fig. 12, and further indicating the change in size of both the kerf or cut and the saw member itself as the latter member has progressed downwardly;

Fig. 20 is another fragmentary cross-sectional view of a part of the body of material shown in Fig. 19 and further illustrating the step of enlarging the kerf in accordance with the method of the invention, utilizing the wire saw member illustrated in Fig. 18;

Fig. 21 is another view of the body of the material shown in Figs. 19 and 20 and further illustrates the step of introducing a second normal size wire in the enlarged section of the kerf, and thereafter producing a second tapering kerf extending downwardly from the first kerf; and Fig. 22 is a detail elevational view of a forming element of the invention.

I have discovered that a novel wire sawing operation may be carried out by exerting helically directed abrasive-applying forces which are caused to act simultaneously on two opposite surfaces within a saw cut, whereby the cut may be selectively reamed out to a desired diameter or width.

I have further found that one desirable and practical way of continuously generating helically directed forces is to provide a resilient helical saw body which normally is of a diameter greater than the width of the kerf in which the saw body is to run. I then compress the saw body by drawing it through a saw cut in granite and simultaneously elongating the resilient body with a consequent reduction in its diameter.

I have still further found that I may provide a resilient helical body of the required magnitude by helically forming a wire saw of conventional type while it is in a running position so that the saw takes on the shape and characteristics of an extended coil of resilient wire.

I have further devised a unique method and apparatus particularly designed to form a wire while it is in a running position and at various points therealong.

I find that I may employ helically directed abrasive-applying forces in various ways as, for example, in conjunction with a conventional form of wire sawing or independently thereof. Thus, in one preferred embodiment of the invention, a normal tapered saw cut, as obtained with a standard sawing operation described above, is first produced and thereafter, at a point where the abrasive carrying capabilities of the standard saw wire are substantially reduced, I form all or a portion of the wire into a helical body. I then utilize this helical body to exert abrasive applying forces which act to enlarge the bottom of the cut. When the enlargement has been effected, a second standard size saw wire can be substituted in place of the formed wire and reeved through the enlarged cut. Successive sawing and reaming operations may be repeated as desired until a vertical cut is carried to a required depth.

The invention is hereinafter described in detail with reference to this preferred procedure of first cutting with a conventional wire saw then reforming and reaming and then replacing the formed wire with a standard size saw wire. However, it should be understood that this is not done in any limiting sense, and the invention may be practiced in connection with various other cutting or sawing operations either in the field of quarrying or in other fields.

The formed saw H is shown in Fig. 1 radially compressed in a running position in which it exerts helically directed forces against opposite sides of a kerf K formed in a body of granite G. The kerf K is shown in Fig. 1 as it looks at the start of a reaming operation. Figs. 19, 20 and 21 show successive steps of reaming and cutting. Figs. 2–5 indicate wire forming apparatus used to form the saw body.

Attention is directed to two novel and related steps to be noted in connection with the reaming operation of the invention as diagrammatically indicated in Fig. 1.

One novel step is that of exerting helically directed abrasive applying forces which are caused to act simultaneously on two opposite surfaces within a saw cut to produce a reamed cut of approximately annular cross section as distinguished from the tapered type of cut resulting from ordinary wire sawing. The step is based upon a recognition of the fact that, if a resilient helical wire body is drawn into a saw cut in a radially compressed state and is then dragged along the cut in the presence of a suitable abrasive, such as silicon carbide grains or the like, the resiliency of compressed portions of the helical body is sufficient to force abrasive against opposite sides of the cut as well as downwardly.

In actual operation, these oppositely acting abrasive applying forces are exerted along a series of spaced-apart interrupted helical paths, as has been suggested diagrammatically by arrows in Fig. 1, and they cooperate with the dragging forces of the running wire to provide a reaming effect of substantially cylindrical cross section, as noted in Fig. 20. An immediate advantage which derives from the reaming action thus achieved is the opportunity to successively introduce several relatively short lengths of saw wire to do the work of a single wire of much greater length.

A second novel step of the invention is that of forming, from a wire saw which has been worn, a continuous helical body capable of developing suitable abrasive applying forces. This forming operation is based on the simple concept of curling an elongated wire body by continuously bending or stressing one side of the wire more than an opposite side with the result that the stressed portions seek to lay over to one side or another as they leave the forming tool and, in so doing, assume a helical shape of definite and controllable pitch and diameter characteristics such as has been represented by the curled wire shown in Fig. 1.

An important part in this helicoid forming method of the invention is carried out by the special forming apparatus which has been devised to mechanically curl the wire while it is in the form of an endless loop and while it is still running in a partly finished saw cut. The forming structures shown in Figs. 2–6, inclusive, provide, in effect, a portable attachment which can be brought into association with a running loop of wire at any point therealong and which acts to guide the wire through sharply reversed paths to bend or curl the wire continuously along one side more than another.

It will readily be seen that the operation of forming and applying a special reaming saw in a saw cut is greatly simplified with such an apparatus.

Further description of the forming of the helical saw body may be conveniently considered in connection with a conventional wire sawing apparatus of the type described and claimed in U. S. Patent No. 2,577,523 and No. 2,577,545, both issued on December 4, 1951 and owned by the assignee of the present application. Parts of such an apparatus are shown in Fig. 11 in which is illustrated a body of granite G'.

The body of granite G' is formed with two openings, 4 and 6, between which openings occurs a block of granite G''. This block is sawn by means of a wire saw H' consisting of an endless loop of wire. The wire H' may preferably be of the twisted type, such as illustrated in Fig. 12. This form of wire is often referred to as a helical wire and has helical edges which extend around the longitudinal axis of the saw body. This so called helical saw should not be confused with the helical saw body of the invention where the entire saw body is curled around an axis lying outside of itself. In place of the saw H' of Fig. 12, I may also utilize a wire H'' composed of two components twisted about one another, as shown in Fig. 13, as well as a wire H''' composed of three strands twisted together. Any one of these saws may be curled or formed into the helical saw body of the invention.

The wire saw H', as shown in Fig. 11, is normally held in a cutting position with respect to the block G'' by means of a pair of sawing sheaves, 10 and 12, rotatably mounted on vertically adjustable bearings 14 and 16. The bearings are slidably received in vertical channel members 18 and 20 mounted on the bottoms of the holes 4 and 6 which have been previously formed by conventional core drilling. Each bearing is positioned by means of rotatable drums 22 and 24 around which are wound suspension wires 26 and 28.

The wire saw H', at some suitable power supply point, is driven by a sheave 30 which is rotated by a motor-driven pulley 32, as shown in Fig. 11. Portions of the wire H' leaving the top of the drum 30, for instance, may pass outwardly, as suggested by the arrows in Fig. 11, and at some point is received over a pivoted guide sheave 34. The peripheral surface of this sheave 34 is arranged to lie in tangential relationship with respect to a vertical line which is also tangential to the sheave 10. A second guide sheave 36 receives the wire as it travels upwardly and guides it toward a suitable system of supporting sheave structures which structures may occur between the points indicated by the arrows A and B at the interrupted sections of the wire H' shown in Fig. 11.

At some convenient point, the wire passes to a tension device, such as that shown in Fig. 11, in which is included a permanently mounted sheave 38. Arranged to slide on a platform 40 is an adjustable sheave 42 which may be moved into a position such as the dotted line showing in Fig. 11 to vary the tension on wire H'. A change in tension is effected by changing the weight W which is held between stops by a conventional electrical motor-driven member controlled by limit switches such as S.

As an aid to more readily visualizing a typical operation of sawing a slab of granite away from a block of this material as it occurs in a quarry, specific dimensions and other values may be set forth. For example, the wire saw member H', as commonly employed, has a working diameter of approximately .200 inch. To utilize a saw of this diameter in cutting a slab of granite having, for example, a width of from 100 to 110 feet and a height of, say, 70 feet, it would be necessary, in a conventional sawing operation, to use a single wire loop having a length of, roughly, 80,000 feet. This is, of course, a great deal larger saw length than is feasible to use.

In accordance with the method of the invention, however, successive lengths of wire saw may be employed and, by means of the wire curling operation, employed one after another at suitable points controlled by wear of the saw diameter, for example, to a value of .120 inch. The saw length for each of these four loops may, for example, run from 12,000 to 15,000 feet. It is pointed out that the reaming process makes possible this successive use of separate loops. It is found that this length is convenient to reeve, and that running continuously it can be expected to wear out during the early part of the fourth subsequent day of operation. This is a convenient interval in planning other quarry operations.

The detailed operation of replacing a worn wire in a tapered saw cut consists in the following steps. The worn saw is stopped. At points between supporting sheaves, a portion of the worn wire is cut out and the remainder of the worn saw is secured. Ends of the cut-out piece of wire are then joined so that there is obtained a loop of, for example, 4,000 feet of wire which passes through the saw cut. This avoids the time and labor of coiling or curling a longer loop. The relatively short length of wire thus obtained is then driven in the wire system at a tension of about 200 pounds and at a speed of about 400 feet per minute over any one of the curling devices shown in Figs. 2–5.

I prefer to carry out the curling operation with the aid of the curling roll structure shown in Figs. 2, 3, 4 and 5, although good results may be obtained with the structure shown in Fig. 6, and also by the roll 50 shown in Figures 11 and 22. The curling roll structure of Fig. 2 includes upper and lower rolls R and R', each of which are, for example, about two inches in diameter and have grooves cut in them, as shown in Fig. 2, to receive a saw wire W. Each roll is free to turn on respective shafts S and S'. The two shafts are fixed in an arm M pivotally mounted on a pin P. The latter member is transversely located through a portable frame F which can be located in a truck or other vehicle or, if desired, permanently mounted at some desired station in close proximity to the saw W. The arm M is normally located in a horizontally disposed position and can be swung through some desired arc, such as an arc of 180°, as suggested in Figs. 2–5.

To engage the saw W while it is running, the curling rolls are positioned close to the wire in a position such that the wire may pass between them and be directed into the roll grooves. The arm M is then rotated into a position such as that shown in Fig. 2. As a result, the wire is caused to follow along a Z-shaped path and it comes off the upper roll in a progressively curled manner as has been diagrammatically indicated in Figs. 3, 4 and 5.

On the first pass through the rolls, the wire is formed into a helical body which, under the tension of 200 pounds above noted, has a helical diameter of about one inch and a helical pitch of about three feet, as has been diagrammatically suggested in Fig. 18.

When the entire 4,000 feet of wire has passed the curling rolls R and R' and the first formed portions of the wire have come around to the rolls again, the wire is disengaged from the roll. The wire may then be run in the saw cut, for example, at the same speed of 400 feet per minute and, at this time, the operator may feed new high quality abrasive into the cut. When the curled saw is up to speed and running smoothly, the tension may be gradually released from the 200-pound value down to, for example, 75 pounds.

The reaming operation thus initiated may then be carried out for a period of from five to ten minutes, for example, and the wire is then stopped and the curling rolls are re-engaged. Tension of 200 pounds is again applied and the wire is recurled. The helical body may be reformed so that it has a helical diameter of, for example, one and one-half inches and a helical pitch of, for example, 18 inches. The effect of this is to increase the helically directed abrasive carrying power of the saw. To take advantage of this increased abrasive carrying power, the recurled wire is again run through the partly reamed saw cut with tension again being gradually released until the reaming operation has been carried on for a total reaming period of 20 minutes.

The curled wire may then be stopped and cut with the free ends being joined back to the remainder of worn wire originally cut and immobilized during the curling operation. The entire length of 14,000 feet of wire, which includes both the uncurled worn portion and the curled worn portion, is then used to reeve into the saw system a new length of 14,000 feet of saw wire having the working diameter of .200 inch earlier specified. This new wire is easily drawn into the bottom of the cut which has been fully reamed out and the ends of the new wire are joined and the system is then ready to resume conventional sawing. It should be noted that this entire wire replacement curling and reaming operation requires a period of about 2 hours.

In carrying out a reaming operation such as that described in a cut of the magnitude indicated, the enlargement of the cut may, in some cases tend to take a shape such that it is larger at the end where the curled wire enters the cut and less where the wire leads out of the cut. The reason is that the tension in the wire is greater at the end where the wire leaves the cut, and the effect of this is to elongate slightly the helicoid shape of the wire and to reduce its helical diameter. I have found that I may deal with this problem and provide for uniformity of reaming in either one of two ways. I may apply abrasive of less cutting power, i. e., particles which are less sharp or of smaller size, to the entering end of the saw cut as distinguished from the lead-out end. This operation has been illustrated in Figs. 7, 8, 9 and 10 in which there has been illustrated a relatively fine abrasive X indicated at one end of a saw cut and a relatively coarse abrasive Y has been shown used at the opposite end of the saw cut. By applying an abrasive of relatively greater cutting power in this selective manner, a compensation takes place with the result that the reaming becomes more uniform throughout the entire length of the cut.

A second procedure for overcoming non-uniformity of reaming, I find, may consist in stopping the entire wire system when the reaming operation is about one-half completed. The saw is then reversed in direction and run for another period corresponding to the first period. This operates to apply the difference in tension in the wire in such a way as to result in a substantially uniform enlargement in the saw cut. This operation of reversing the direction of the saw has also been diagrammatically indicated in Figs. 9 and 10, as suggested by the directional arrows occurring in these figures.

In Figs. 19, 20 and 21, I have shown progressive saw cuts carried out by means of a wire saw and a curled wire reaming portion. Thus, in Fig. 19, I have shown the wire W in the granite block G" and at a point at which the wire has cut a kerf K' of tapering shape and the wire saw has become worn to a point of requiring replacement by new wire. In Fig. 20, I have illustrated diagrammatically the wire W which has been reformed to assume a helical shape and which has been run in the saw cut to provide a reamed-out bottom opening K" of a substantially cylindrical cross section which is sufficiently large to take the diameter of a new wire saw. In Fig. 21, I have illustrated a wire W' which replaces the wire W in the reamed cut K" and which has been employed to form a second tapering cut K'''. This second cut is ready to undergo a second reaming operation of the type illustrated in Fig. 20.

It will be evident that, by the method described, a series of tapering cuts and intervening reamings may be employed to saw out granite slabs of relatively great heights. In the course of sawing these granite slabs, there may develop instances where it is desired to cut a vertical kerf of some desired magnitude and then interrupt the sawing while intermediate slab forming operations are carried out. In such case, it may be desired to leave the saw in the bottom of the cut for some little time. Trouble develops in doing this because the saw is subject to rusting and there occurs a constant settling of abrasives, granite chips and other material around the saw which pack around it and cause it to become solidly jammed so that it would be impossible to start the saw running at a later time.

I have found that I may overcome this difficulty by temporarily replacing the steel wire in the cut with a round cross-section high-tensile strength galvanized wire which it is found not only resists rusting but also, because of its smooth surface characteristics, will resist jamming in the presence of dirt and granite chips.

I may also desire to practice the curled wire reaming operation in various other ways than those specified. For example, I may wish to use a curled wire saw without preceding or following it by a standard type saw. The reaming operation may be carried out with different types of saws than the single-strand type, for example, such as those shown in Figs. 13 and 14. These multi-strand types of saws, as well as the single-strand type of saw, all wear in the manner illustrated in Figs. 15, 16 and 17 and all of these saws may be shaped to assume a helical body in accordance with the invention. In forming all or any of these saw types, I may use other types of curling roll structures or forming devices. For example, in Fig. 6, I have shown a saw forming device consisting of hollow shafts 80 and 82 through which a saw W'' may be led. A belt 84 rotates the hollow shaft 82 which operates to impart a turning movement to the saw W''. Between the rolls 80 and 82 are three curling rolls 86, 88 and 90 over which the saw may be guided to produce a helical shape such as indicated at the left-hand side of Fig. 6. Similarly, I may utilize a vertically adjustable roll 50 mounted in the apparatus of Fig. 11 as well as other devices. In some cases where the ream to be made is not of great length, a single roll 50 may produce an adequate curl such as indicated in Fig. 11. In this figure, the roll 50 is brought to bear on the wire by being raised vertically by mechanical means. Fig. 22 shows, in enlarged form, how the wire H' passes over the roll 50.

An unusual feature of my method of sawing is that the kerf which is being cut may be controlled in size so that it may vary in width, as desired, by properly controlling the tension in the wire. This affords a very useful flexibility not heretofore enjoyed in wire sawing operations. In view of the fact that the saw is dimensionally responsive to tension, a still further advantage is present in extending the life of a worn saw element for sawing without necessarily enlarging the kerf. It is pointed out that, in a worn saw which no longer will carry abrasive, there still remains a very substantial portion of the cross-sectional area of its metal. Since the forming operation operates to restore space or irregularities in the wire, there is obtained a renewed usefulness, especially if the tension is not relaxed to the same extent as would be the case if an enlarging operation was carried out. The forming operation may be desired to be repeated as often as the abrasive space becomes worn away in the wire to the end that the usefulness of the wire may be rapidly restored.

In addition to the use of a former element, such as the devices in Figs. 2, 6 and 22 described, I may also employ various other forming mechanisms, such as, rolls, dies, and the like, which may be engaged or forced against a wire member to produce a set therein. Similarly, the formed wire member may be utilized with various other types of tensioning devices for varying the tension in the wire, as well as the size which it has at any particular point.

From the foregoing description, it will be evident that the present invention includes a number of important discoveries in the art of wire sawing and, as a result of these discoveries much needed and desirable improvements in wire sawing operations are made possible. The entire range and scope of wire sawing is materially broadened both in connection with quarrying and other types of cutting operations where a wire saw may be applied.

While I have shown and described a preferred embodiment of the invention and have indicated certain alternate forms thereof, it should be understood that various other changes and modifications may be resorted to in keeping with the spirit of the invention as defined by the appended claims.

This application is a continuation of my copending application Serial No. 452,275, filed August 26, 1954, now abandoned.

What I claim is:

1. In a method of wire sawing which comprises passing a wire saw element along a surface to be cut and simultaneously applying an abrasive carried into contact with the said surface by the saw element to produce a kerf of decreasing width, the steps which comprise introducing into the bottom of the said kerf in the presence of the abrasive a length of helically shaped wire having a helical diameter greater than the width of the kerf at its narrowest point, elongating and radially compressing the said length of wire saw to a size which permits the saw to pass through the kerf in sliding contact therewith, and simultaneously abrading the sides which define the bottom of the kerf by means of helically directed forces exerted through compressed portions of the saw to form an enlargement of the kerf, then leading into the enlarged portion of the kerf a wire saw element corresponding in size to the said first wire saw element, and sawing a second kerf extending away from the point of enlargement.

2. In a method of wire sawing in which a kerf is formed in a body of material, the steps which comprise passing a helically-shaped saw along the bottom of the kerf in the presence of an abrasive, said saw having an helical diameter which exceeds the width of the kerf, and simultaneously elongating and radially compressing the helically-shaped wire saw whereby an increase in pressure is exerted on the abrasive and the kerf is thereby enlarged.

3. In a method of wire sawing, the steps which include passing a wire saw along a surface to be cut in the presence of an abrasive thereby to form a kerf which decreases in width as it extends downwardly then curling the saw to provide an helically-shaped body having an helical diameter which exceeds the width of the kerf at its narrowest point, whereby the curled wire saw is compressed upon reentry into said kerf to provide radially outwardly exerted forces and then drawing the compressed curled saw portions through the kerf to form an enlargement of the kerf.

4. In a method of wire sawing, the steps which include passing a wire saw along a surface to be cut in the presence of an abrasive thereby to form a kerf which decreases in width as it extends downwardly then curling the saw to provide an helically-shaped body having an helical diameter which exceeds the width of the kerf at its narrowest point and compressing the curled wire saw portions radially so that they will produce radially outwardly exerted forces and then drawing the compressed curled saw portions through the kerf to form an enlargement of the kerf.

5. A method according to claim 4, in which the direction of movement of the curled saw is reversed.

6. A method as described in claim 4, in which the saw is repeatedly subjected to a curling operation to renew its abrasive-carrying capabilities.

7. A method as described in claim 4, in which the step of curling the said first saw comprises leading the saw around a cylindrical surface of relatively small diameter in order to produce a coiling of constituent portions thereof.

8. A method according to claim 4, in which the saw is conducted over a plurality of spaced-apart cylindrical surfaces along a substantially Z-shaped path.

9. A method as described in claim 4, in which the step of elongated and compressing the wire saw is carried out by applying a tension force on one end of the said length of shaped wire saw, and further including the step of varying the tension applied to the shaped wire saw to control the width of the saw kerf at its said point of enlargement.

10. Apparatus for sewing a block of granite and like material comprising a wire having a helically shaped portion, the diameter of the coil forming the helically shaped portion being greater than the width of the kerf being cut, means for supporting the wire, and means for moving it and maintaining it under tension to decrease the diameter of the coil but maintaining the coil in abrasive engagement with surfaces of the block to cut the kerf in the block.

11. The invention as described in claim 10 with means for curling the wire to its original diameter during use.

References Cited in the file of this patent

UNITED STATES PATENTS 2,158,830   Newsom _____ May 16, 1939

FOREIGN PATENTS 750,081   France _____ May 15, 1933